No. 837,445. PATENTED DEC. 4, 1906.
A. P. WOLFE.
CORN HUSKING MACHINE.
APPLICATION FILED DEC. 12, 1904.

7 SHEETS—SHEET 1.

Witnesses:
Louis W. Graf
Robert Wertlenich

Arthur P. Wolfe, Inventor
by Geyer & Popp
Attorneys

No. 837,445. PATENTED DEC. 4, 1906.
A. P. WOLFE.
CORN HUSKING MACHINE.
APPLICATION FILED DEC. 12, 1904.

7 SHEETS—SHEET 4.

Witnesses:
Louis W. Gray
Robert Weiknecht

Arthur P. Wolfe
Inventor
by Geyer & Popp
Attorneys.

No. 837,445. PATENTED DEC. 4, 1906.
A. P. WOLFE.
CORN HUSKING MACHINE.
APPLICATION FILED DEC. 12, 1904.
7 SHEETS—SHEET 5.
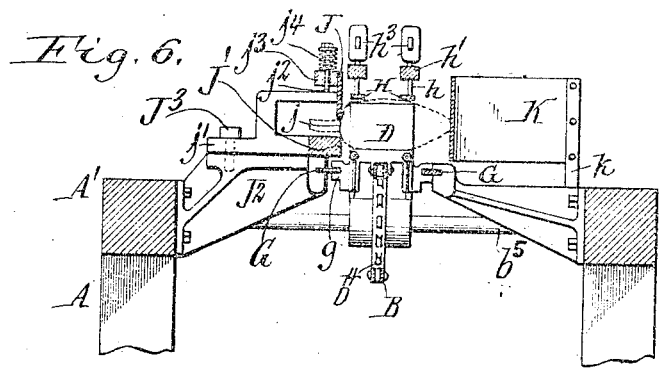
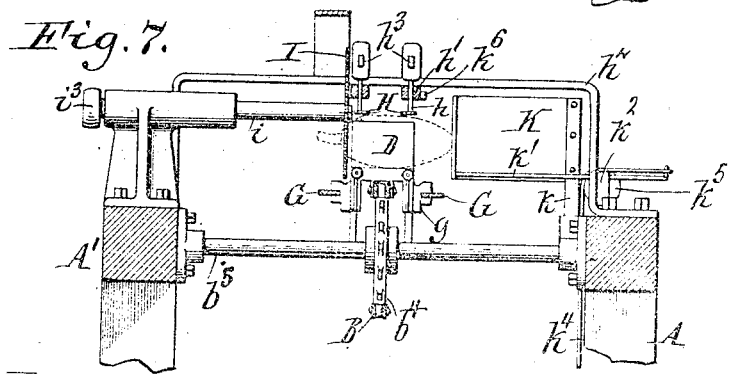
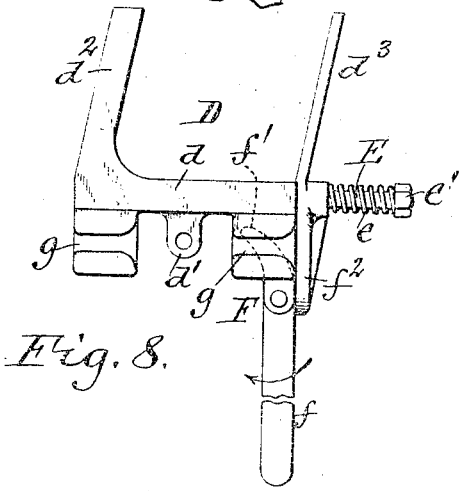
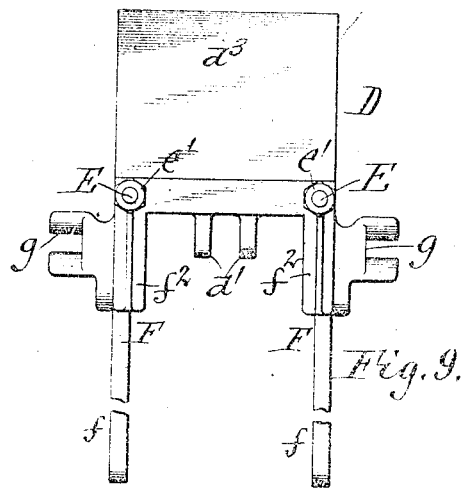

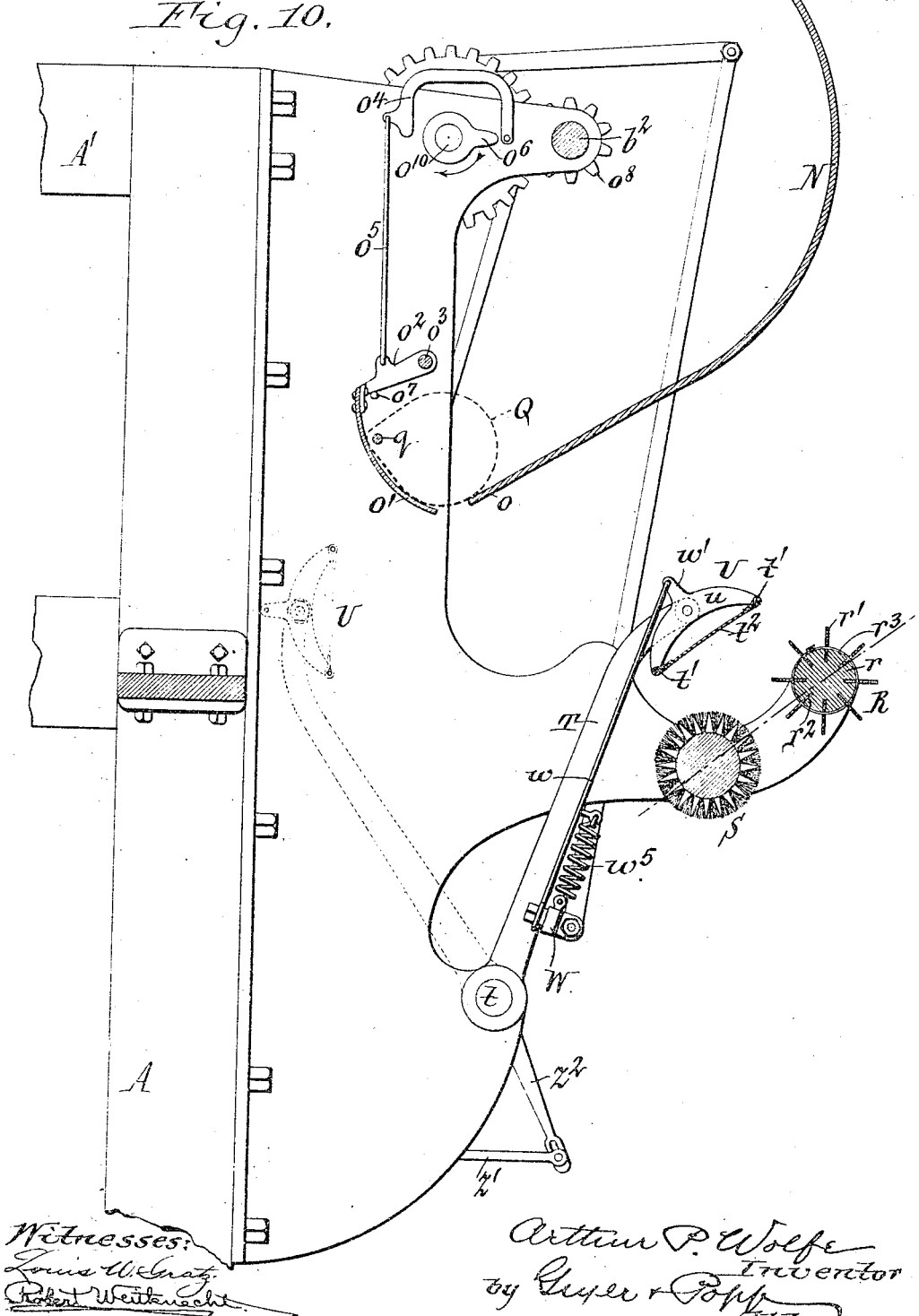

No. 837,445. PATENTED DEC. 4, 1906.
A. P. WOLFE.
CORN HUSKING MACHINE.
APPLICATION FILED DEC. 12, 1904.

7 SHEETS—SHEET 7.

UNITED STATES PATENT OFFICE.

ARTHUR P. WOLFE, OF BUFFALO, NEW YORK, ASSIGNOR TO THE HUNTLEY MANUFACTURING COMPANY, OF SILVER CREEK, NEW YORK.

CORN-HUSKING MACHINE.

No. 837,445.

Specification of Letters Patent.

Patented Dec. 4, 1906.

Application filed December 12, 1904. Serial No. 236,436.

*To all whom it may concern:*

Be it known that I, ARTHUR P. WOLFE, a citizen of the United States, residing at Buffalo, in the county of Erie and State of New York, have invented new and useful Improvements in Corn-Husking Machines, of which the following is a specification.

This invention relates to a corn-husking machine, and has the object to produce a machine for this purpose which will husk the ears of corn thoroughly and expeditiously without injury to the kernels or undue loss of the same.

Figure 1:
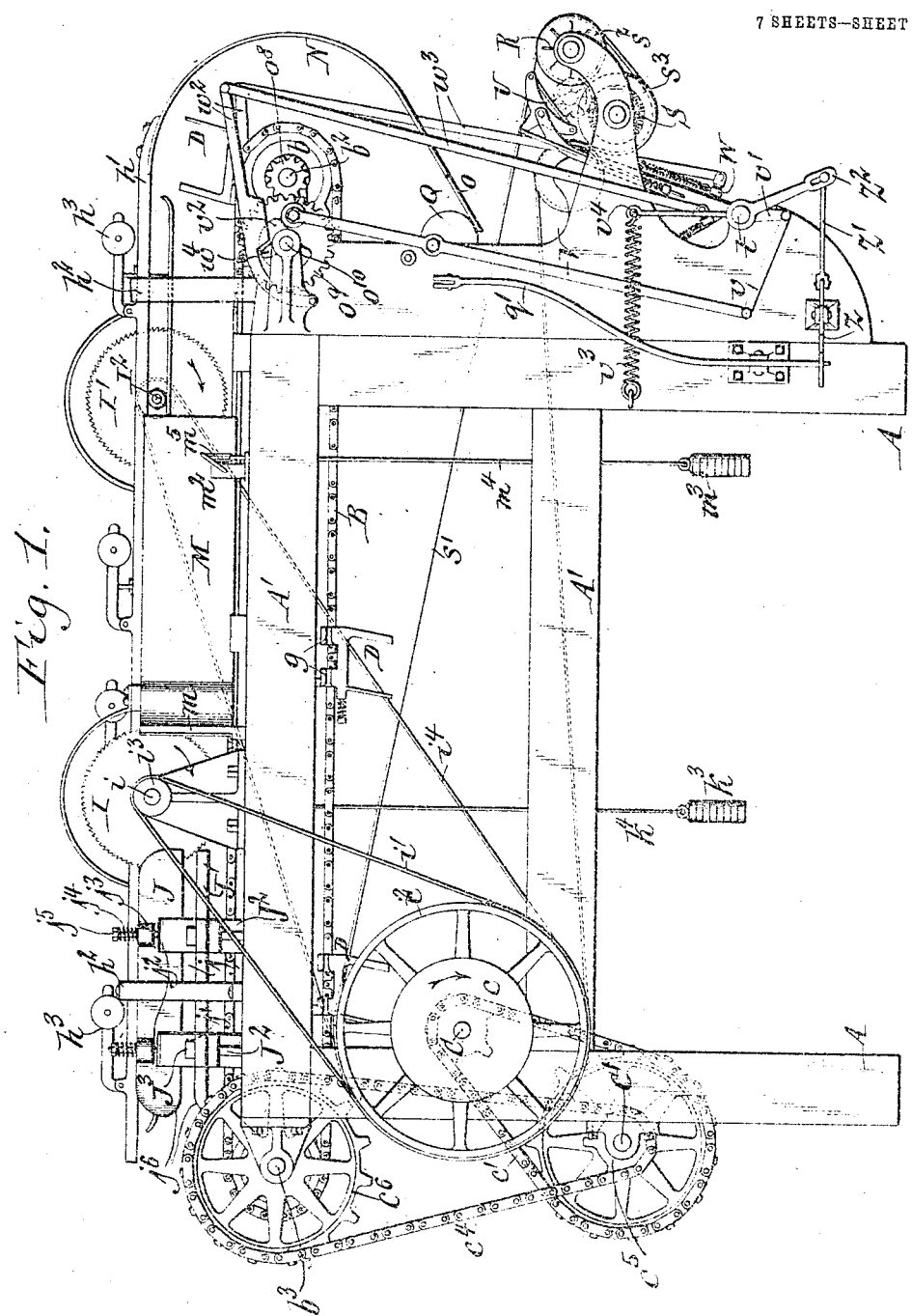
Figure 2:
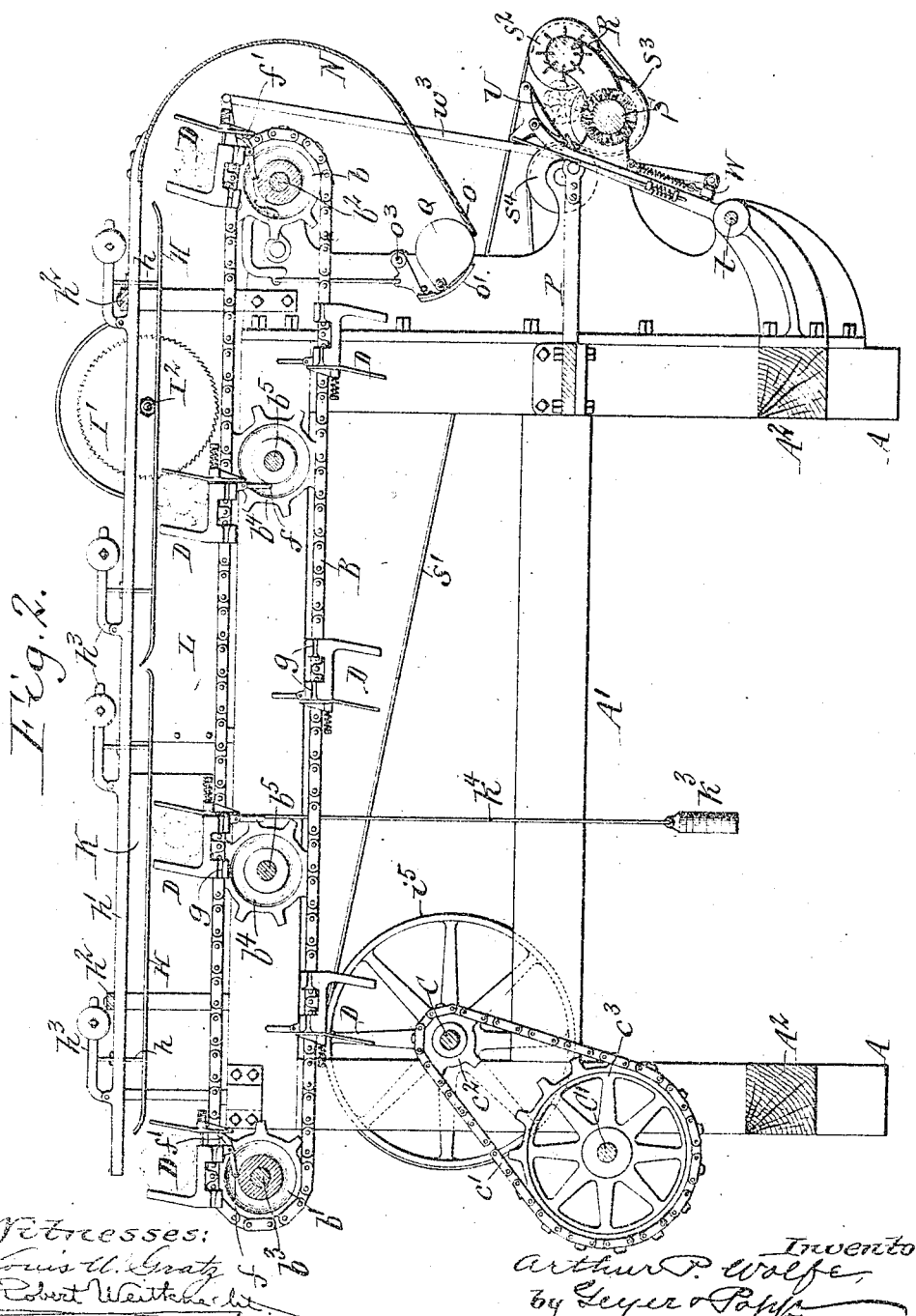
Figure 3:
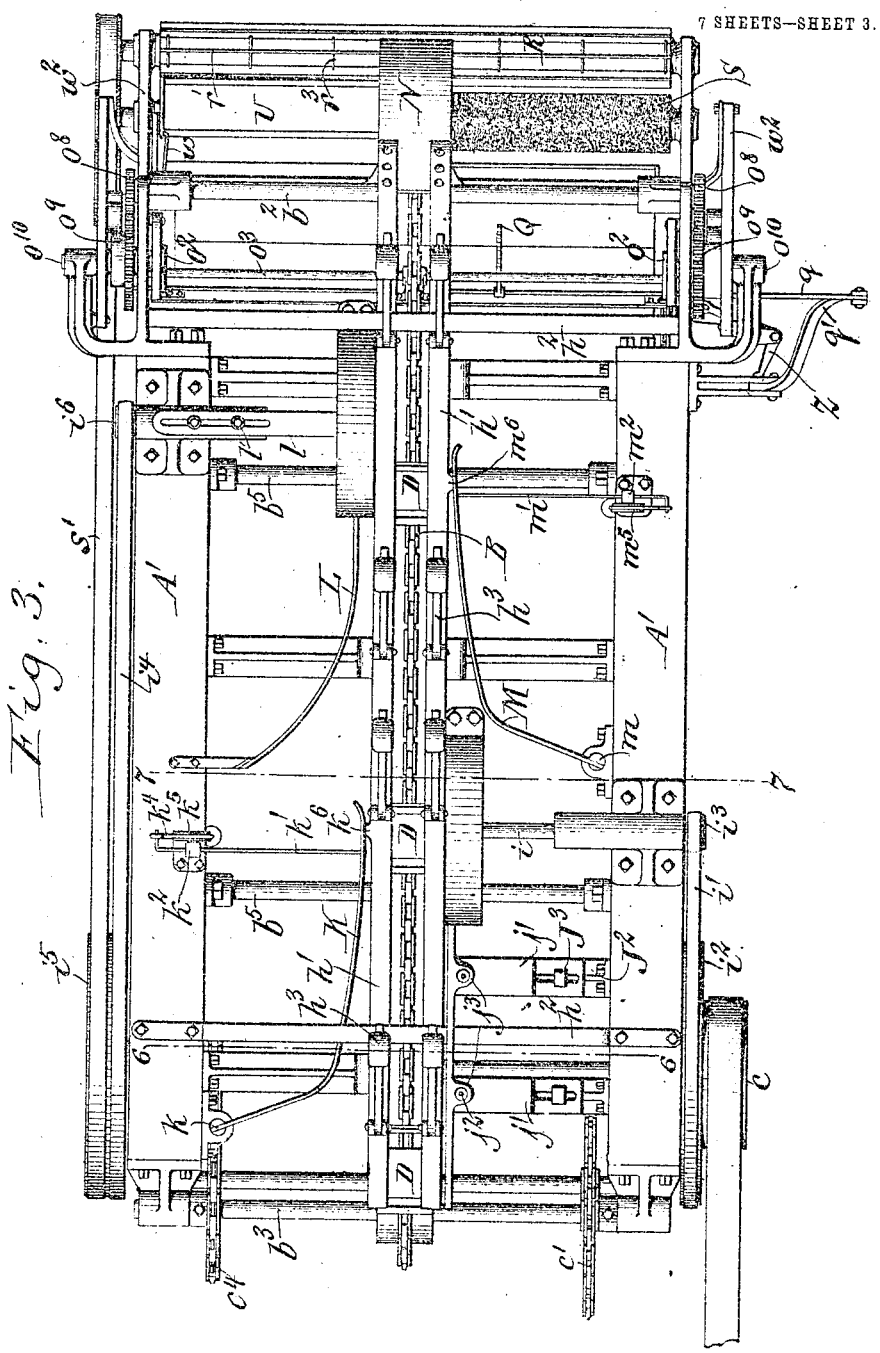
Figure 4:
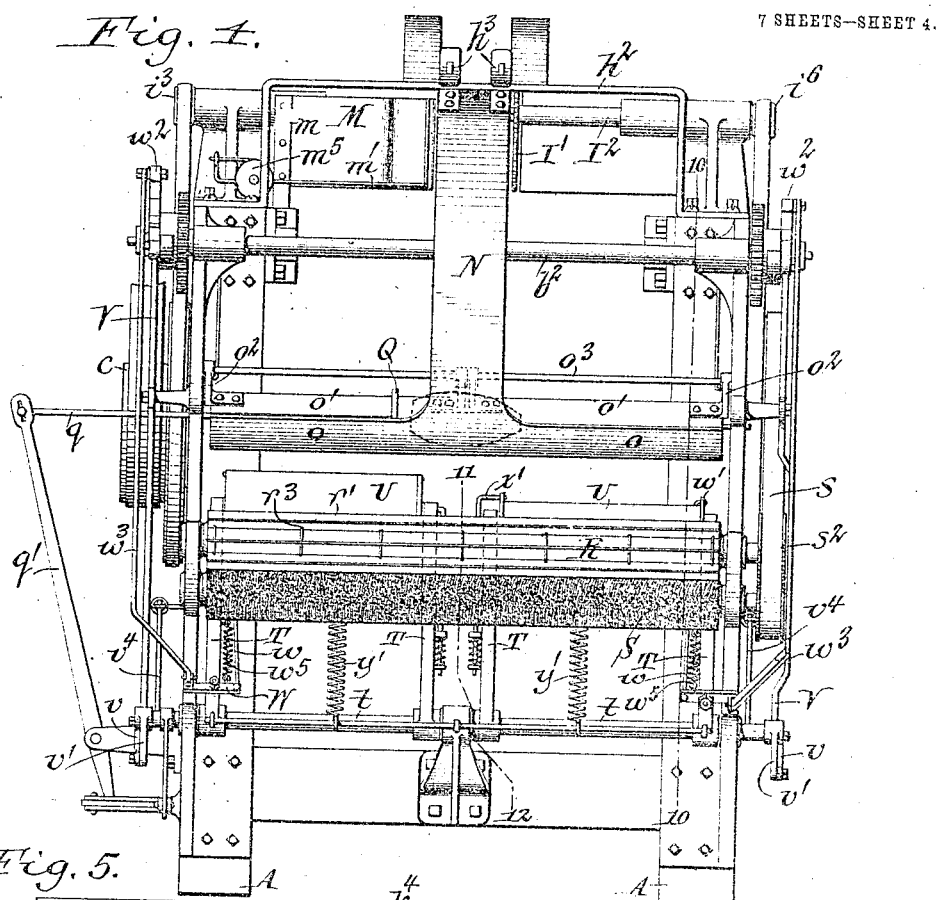
Figure 5:
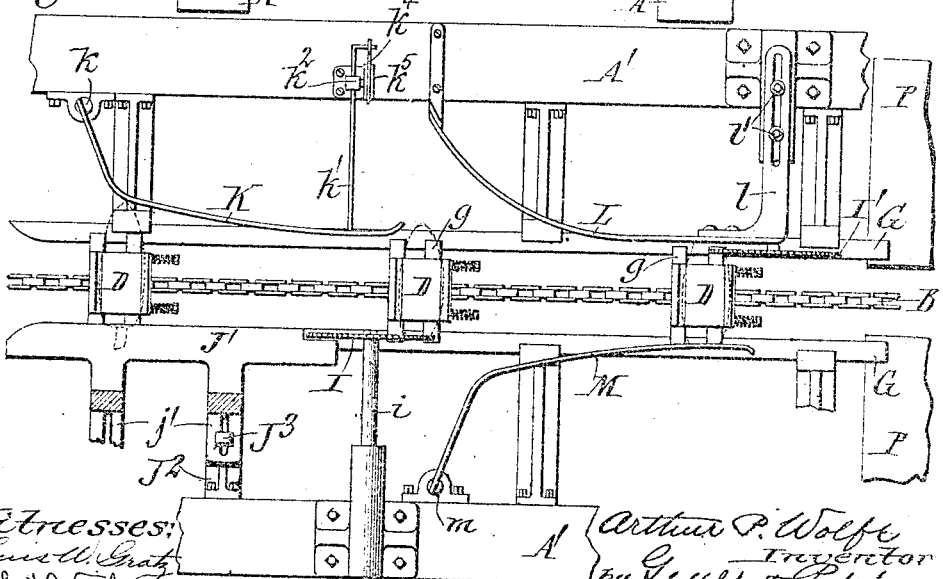
Figure 11:
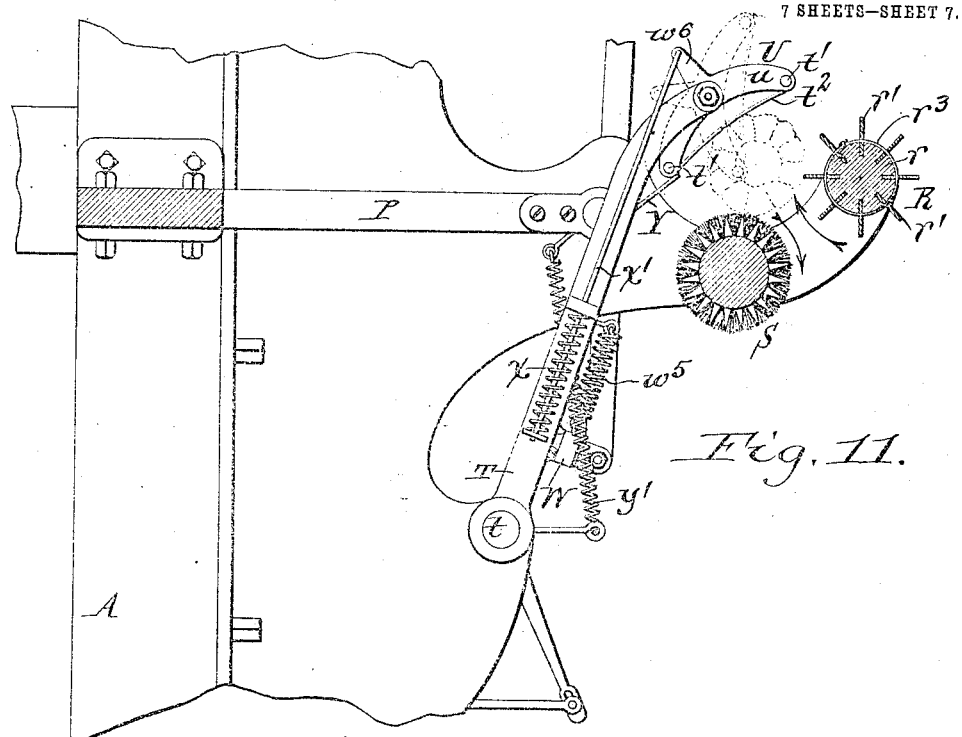
Figure 12:
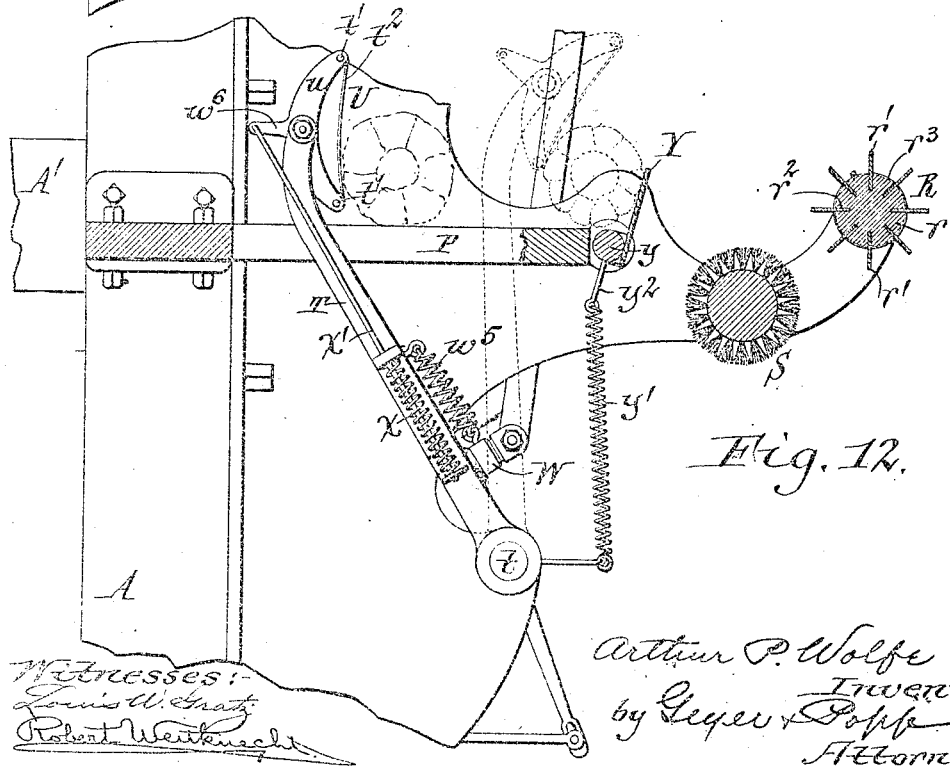

In the accompanying drawings, consisting of seven sheets, Figure 1 is a side elevation of my improved corn-husking machine. Fig. 2 is a vertical longitudinal section of the same, taken lengthwise through the central part thereof. Fig. 3 is a top plan view of the same. Fig. 4 is a front elevation of the same. Fig. 5 is a fragmentary horizontal section showing the means for guiding the ear-holders while the same are in use. Figs. 6 and 7 are fragmentary cross-sections in lines 6 6 and 7 7, Fig. 3. Fig. 8 is a detached side elevation, on an enlarged scale, of one of the ear-holders. Fig. 9 is a front view of the same. Fig. 10 is a fragmentary vertical longitudinal section, on an enlarged scale, taken in line 10 10, Fig. 4, showing part of the husking mechanism and the means for delivering the ears of corn to the same. Figs. 11 and 12 are similar views taken in lines 11 12, Fig. 4, showing some of the parts in different positions from that shown in Fig. 10.

Similar letters of reference indicate corresponding parts throughout the several views.

In its general organization the machine consists of a carrier provided with a plurality of holders, each of which in turn receives an ear of corn and presents the same successively to devices for gaging the ear and cutting off the opposite ends thereof and then discharges the ear to devices which remove the husks and silks therefrom.

The main frame of this machine may be of any suitable construction, that shown in the drawings consisting of uprights or posts A, longitudinal pieces A', and cross-pieces A².

The carrier for the corn preferably consists of an endless chain belt B, which is arranged lengthwise in the upper part of the frame and has an upper operative portion and a lower inoperative portion, both arranged horizontally. This chain is supported at its front and rear ends by means of sprocket-wheels $b\ b'$, which are mounted on transverse shafts $b^2\ b^3$, journaled in bearings at the respective ends of the frame, and the intermediate parts of this belt pass around supporting sprocket-wheels $b^4$, which are mounted on intermediate shafts $b^5$, journaled in bearings on the adjacent part of the main frame. This belt is driven so that its upper operative portion moves forwardly by means of a driving-shaft C, journaled in bearings on the lower rear part of the main frame and having a driving-pulley $c$, by which motion may be transmitted to the same from a suitable source, a chain belt $c'$ passing around a sprocket-pinion $c^2$ on the driving-shaft and a sprocket-wheel $c^3$ on a counter-shaft C', journaled in bearings on the lower rear part of the main frame, and another chain belt $c^4$ passing around a sprocket-pinion $c^5$ on the counter-shaft and a sprocket-wheel $c^6$ on the shaft which supports the rear sprocket-wheel of the carrying-belt.

Upon the carrying-belt are mounted a plurality of grippers or holders D, each of which receives an ear of corn and presents the same successively to the gaging and cutting mechanisms. Each of these holders is constructed generally in the form of an outwardly-opening pocket or receptacle and comprises a bottom $d$, which has depending lugs $d'$ on its under side for attachment to the carrying-belt, a fixed rear wall or jaw $d^2$, projecting upwardly from the rear end of the bottom, and a yielding front wall or jaw $d^3$, projecting upwardly from the front end of the bottom. This yielding wall or jaw of the holder is preferably movably supported upon the bottom of the holder by means of two horizontal guide-rods E, secured to the bottom and passing through openings in the lower part of the yielding jaw, and springs $e$, surrounding the rods between the outer side of the movable jaw and a shoulder or nut $e'$ at the outer end of each rod and operating to yieldingly move the front jaw of the holder or gripper horizontally rearward toward the fixed rear jaw.

The ears of corn may be fed successively into the holders of the carrier either by hand or by automatic means. If desired, the ear of corn may be placed in the holder by forcing the same downwardly between the jaws thereof and crowding the front jaw forwardly during this operation as much as necessary to permit of introducing the ear of corn into the holder. It is preferable, however, to first separate the jaws so as to permit of introducing the ears freely into the holder and then allow the jaws to close upon the ear of corn for gripping and holding the same in place while the ear is being presented to the gaging and cutting devices. The means shown in the drawings for opening or separating the jaws of the gripper are constructed to effect this operation automatically while the holders are passing upwardly around the receiving or rear sprocket-wheel in position to receive an ear of corn and again when passing downwardly around the delivery or front sprocket-wheel of the carrying-belt to permit the ear of corn to discharge from the holder.

As shown in Figs. 1, 2, and 6-9, the opening means for each gripper or holder consists of a pair of opening-levers F, pivoted to turn vertically on the lower or inner part of the holder on opposite sides of the carrying-belt. Each of these levers has an outer trip or tappet arm $f$, which is adapted to engage with a stationary abutment for turning the same, and an inner cam or actuating-arm $f'$, which is adapted to engage with a depending lug or extension $f^2$ on the movable jaw for moving the latter away from its companion fixed jaw upon rocking this lever forwardly or in the direction of the arrow indicated in Fig. 8. The abutment for thus turning the releasing-levers is preferably provided by extending the hubs of the front and rear sprocket-wheels sufficiently so that they stand in the path of the trip-arms of these levers. As the holder passes upwardly around the rear sprocket-wheel the trip-arms of its opening-levers engage with the hub thereof, causing the arms of the same to move the front jaw away from the rear jaw, thereby opening the gripper or holder for freely receiving the ear of corn. After the ear has been thus placed in the holder and the latter has been moved forwardly by the carrying-belt sufficient to enable its opening-levers to clear the hub of the rear sprocket-wheel the springs $e$ again move the front jaw of the holder forwardly and securely clamp the ear in the holder. As the holder passes downwardly around the front sprocket-wheel the trip-arms of its opening-levers engage with the hub of this sprocket-wheel and move the front jaw of the holder away from the companion rear jaw to permit the ear of corn to be discharged by gravity from the holder when the latter assumes an inverted position on the lower side of the front sprocket-wheel. In their forward movement the trip-arms of the opening-levers engage with the shafts of the intermediate sprocket-wheels; but this is of no effect, inasmuch as the levers at this time are not turned sufficiently to affect the position of the front gripper-jaws, but permit them to remain securely in their clamped position against the corn.

In order to retain the holder securely in place and insure proper presentation of the corn to the gaging and cutting mechanism, means are provided for keeping the holder or gripper against displacement while moving forwardly with the operative part of the carrying-belt from the rear to the front sprocket-wheels. The preferred means for this purpose (shown in the drawings) consists in providing the bottom of each holder on opposite sides with grooved lugs or ears $g$, which engage their grooves with fixed longitudinal guide-rails G, arranged parallel on opposite sides of the path of the holders, as shown in Figs. 5, 6, and 7.

In order to further guard against displacement of the ears of corn in the holder and prevent the same from being lifted out of the holder while undergoing the gaging and cutting operation, a retaining device is provided, which is constructed to form a closure over the top of the holders and yieldingly engage the upper side of the corn lying therein while the same is carried forward by the operative portion of the carrying-belt. This retaining device preferably consists of two pairs of horizontal retaining-bars H, the members of each pair being arranged parallel side by side and lengthwise in line with the retaining-bars of the other pair. These bars are arranged above the path of the holders so as to form a closure over the mouths of the same and bear against the upper side of the corn on opposite sides of the center thereof. Each retaining-bar is capable of moving vertically independent of the other bars and is guided during this movement by means of vertical stems or rods $h$, projecting from the top of the bar upwardly through a stationary guide or supporting-rail $h'$, arranged lengthwise above the same. Two of such rails are employed for guiding the several retaining-bars, and these are arranged lengthwise side by side and supported from the main frame by arches $h^2$, as shown in Figs. 1, 2, 3, 4, and 7. Each of the retaining-bars is yieldingly held in its depressed position, preferably by means of a pair of weight-levers $h^3$, pivoted on the adjacent supporting-rail and bearing against the upper ends of the guide-rods $h$ of the respective retaining-bar. The downward movement of the latter may be limited by any suitable means—for instance, by stop-pins arranged on the guide-rod and bearing against the top of the adjacent rail, as shown in Fig. 2. The stop-pins are so arranged that the retaining-bars in their lowest position just clear the upper edges of the holder-jaws, so as to avoid undue wearing of these parts if the machine is run while getting the same ready and while no corn is present in the holders thereof. The front ends of the retaining-bars are turned up or rounded so as to guide the corn under the same and also prevent the corn from being injured, which would be liable to occur if the ends were left straight.

As shown in the drawings, the machine is organized for first cutting off the butt-end of the ear and thereafter the tip end; but this operation can be reversed, if desired.

The cutters for removing the butts and tips of the ears of corn preferably consist of circular saws I I', one of which is arranged vertically on one side of the path of the carrying-belt and ear-holders, near the receiving end thereof, while the other is arranged on the opposite side of said path near the delivery end of the belt and holders. The primary cutter is mounted on a horizontal shaft $i$, which is journaled transversely in bearings on the upper part of the main frame and rotated so that its lower part moves rearwardly, as indicated by the arrow in Fig. 1, by means of a driving-belt $i'$, passing around a driving-pulley $i^2$ on the main shaft and a pulley $i^3$ on the primary cutter-shaft, as shown in Fig. 1. The secondary cutter is mounted on the inner end of a shaft $I^2$, which is journaled in a bearing on the adjacent part of the main frame and is driven from the main shaft by a belt $i^4$ and pulleys $i^5 i^6$, as shown in Figs. 1, 2, 3, and 5.

In order to counteract the tendency of the rotary cutters to lift the ears of corn out of the holders while rotating in the aforesaid direction, the front and rear jaws of the holders are inclined forwardly, as shown in Figs. 1, 2, and 8. This causes the ear of corn as it is moved forwardly against the cutters to be drawn downwardly by the wedge action of the inclined rear jaw of the holder, and thereby avoids any tendency to displace the same.

During the first portion of the forward movement of the corn on the operative portion of the carrying-belt the same is operated upon by a gage device, which places the corn in position for cutting off the butt at the proper place by means of the primary cutter I, which gage device is preferably constructed as follows:

J J' represent upper and lower gage bars or rails, arranged lengthwise adjacent to that side of the carrying-belt and holders from which the stub or butt end of the ears of corn project laterally. These gage-bars are separated by an intervening slot $j$, which is wide enough to receive the stub of the corn, but sufficiently narrow to prevent the passage of the butt of the corn, causing the butt of the ear to engage with the gage-bars. Each ear of corn is moved laterally in its holder for engaging its butt-end firmly against the inner sides of the gage-bars by means of a presser-plate K, which is arranged on the opposite side of the path of the carrying-belt and holders and in position to engage with the tip end of the corn as the latter is moved forwardly. This presser-plate is arranged obliquely and inclines from its rear end inwardly and forwardly toward the carrying-belt, so that the ear of the corn upon engaging its tip with the presser-plate is wedged or carried laterally toward the gage-bars. The presser-plate is of such length that it remains in engagement with the tip of the corn while the latter is moved forwardly between the gage-bars and past the butt-cutter I.

In order to enable the presser-plate to adapt itself to different lengths of ears, the same is so mounted that it is capable of yielding and clearing the path of the ear of corn after the same has been moved laterally its fullest extent against the gage-bars. The preferred means for thus yieldingly supporting the presser-plate consists in pivoting the same at its rear end by means of a vertical shaft $k$ to the rear upper part of the main frame and holding the same yieldingly in its innermost position by means of a shifting-rod $k'$, projecting laterally from the front end of the presser-plate through a guide $k^2$ on the main frame, and a weight $k^3$, connected by a cord $k^4$ with the outer end of the shifting-rod, and passing around a roller $k^5$ on the main frame, as shown in Figs. 2, 3, and 7. The inward movement of the primary presser-plate is limited by engaging a stop $k^6$ on the adjacent supporting-rail, as shown in Fig. 3. The inward pressure which is exerted by the plate K against the ear of corn is so determined that this plate positively moves the corn laterally in the holder for engaging its butt-end against the gage-bars, which movement of the corn is permissible, as the front jaws of the holders bear sufficiently light against the corn to permit of this movement; but when the corn has been firmly pressed at its butt against the gage-bars and further movement in that direction is arrested then the presser-plate is deflected against the pressure of the weight $k^3$ by the tip end of the corn passing along the remainder of the inclined portion thereof. After the ear of corn has been thus gaged and while the same is still in engagement therewith the corn is cut transversely at its butt, close to the stub thereof, by the primary cutter I for the purpose of freeing the husks of the corn from this end of the cob. This cutter is arranged adjacent to the inner side of the gage-bars adjacent to the front ends thereof.

In order to prevent the butt of the corn from projecting to any considerable extent into the slot between the gage-bars, and thus avoid cutting off an undue amount of the kernels of corn at the butt-end thereof, means are provided for automatically varying the width of this slot and causing the same to adapt itself to stubs of different diameters. This is preferably effected by rigidly securing the lower gage-bar in place and supporting the upper gage-bar so that the same is capable of yielding vertically.

As shown in the drawings, the lower gage-bar is secured to the lower parts of two heads $j'$ and the upper gage-bar is guided by means of vertical guide-rods $j^2$, projecting upwardly from these heads through perforated ears or lugs $j^3$ on the upper gage-bar. Springs $j^4$, surrounding the guide-rods between the top of the lugs $j^3$, and shoulders or nuts $j^5$ at the upper ends of the guide-rods serve to hold the upper gage-bar yieldingly in its depressed position. The downward movement of the upper gage-bar toward the lower gage-bar is limited by the engagement of the lugs $j^3$ with the top of the heads $j'$. In this position of the upper gage-bar a slot is formed between the two gage-bars, which is just wide enough to take in the smallest stub on an ear of corn for which the machine is set. As the stubs on the ears increase in diameter the same by their wedge action between the lower and upper gage-bars cause the latter to be lifted for widening the slot sufficiently to take in the larger stub. It will thus be seen that the gage device adapts itself automatically to the various diameters of corn-stubs, and a firm bearing for the ear of corn against the gage-bars is provided at its butt close to the stub, which effectually prevents the ear from being shoved through the gage-slot to such an extent as would cause the cutter to remove a considerable portion of the cob which bears kernels of corn. For the purpose of facilitating the entrance of the stubs on the corn between the upper and lower gage-bars the front ends of the latter are rounded, so as to form a forwardly-converging throat, as shown at $j^6$ in Fig. 1, thereby leading the corn-stubs reliably between the gage-bars.

Some kinds of ears of corn have a blunt butt, while others have a pointed butt, and the gage is therefore so mounted that the same can be adjusted laterally toward and from the outer side of the cutter for varying the point at which the butt is cut from the cob, as may be found most desirable for avoiding undue loss of kernels of corn and still free the husks from the cob. When the crop of corn has its ears pointed at the butt, the gage is set farther from the cutter, so as to insure severing of the husks at this end of the ear. If the ears of the corn are comparatively blunt at the butt, the gage is set closer to the cutter, so as to avoid removing any considerable portion of the butt-end of the cob bearing kernels of corn. The preferred means of effecting this lateral adjustment of the gage consists in securing the heads $j'$ to the brackets $J^2$ on the main frame by means of bolts or screws $J^3$ passing through transverse slots in the heads and into the brackets, as shown in Figs. 1, 3, 5, and 6.

After the butt and stub have been thus removed from an ear of corn the same is operated upon by a second gage device which determines the position for cutting off the tip end of the corn by the secondary cutter I' to the required extent for liberating or loosening the husks at this end of the ear. This gage device comprises a secondary gage bar or plate L, which is arranged on the same side of the path of the carrying-belt and holders as the primary presser-plate and secondary cutter, and a secondary presser-plate M, arranged on the same side of the path of the carrying-belt and holders on which the primary cutter is located, as shown in Fig. 3. The secondary cutter for removing the tip of the ear of corn is arranged between the rear part of the secondary gage-plate and the path of the belt and holders. The secondary gage-plate is arranged obliquely and inclines or curves from its rear end toward the carrying-belt and secondary cutter and is rigidly secured at its rear end to the adjacent part of the frame, while its front end is made transversely adjustable by being secured to the adjacent stationary part of the machine by means of an adjusting-bar $l$ and clamping-bolts $l'$ passing through a slot in said bar and into the bearing of the secondary cutter-shaft, which construction permits the front end of said plate to be adjusted toward and from the secondary cutter for determining the length of the stock which shall be removed from the tip end of the ears of corn. The secondary pressing device is constructed in all respects like the primary pressing device and comprises an oblique plate which is pivoted, by means of a vertical shaft $m$, at its rear end to the main frame, a guide-rod $m'$, projecting outwardly from the front end of the presser-plate through a guide-lug $m^2$ on the outer part of the main frame, and a weight $m^3$, secured by a cord $m^4$ to the outer end of the guide-rod and passing around a guide-pulley $m^5$, thereby operating to hold this presser-plate yieldingly in the path of the butt of the corn. The inward movement of this presser-plate is limited by engaging its upper end with a stop $m^6$ on the adjacent supporting-rail, as shown in Fig. 3. As the ear of corn is carried forwardly by its holder from the primary cutter the butt-end of the ear engages with the secondary presser-plate M and is shoved laterally by the same in its holder until its tip end bears firmly against the opposing gage-plate L, after which the presser-plate yields to permit the ear of corn to clear the same. After the ear of corn has been thus moved against the secondary gage-plate the tip thereof is cut off by the secondary cutter as the ear is carried past the same during the continued forward movement thereof with the holder. The butts and tips which are removed from the corn drop through the lower part of the frame upon the floor or may be otherwise disposed of. After the corn has been trimmed off at the tip in the manner described the holder is opened in its downward passage around the front or delivery sprocket-wheel and the ear is discharged therefrom upon a curved or inclined chute N, which directs the same rearwardly and downwardly to the devices which control the feed of the same to the husking devices. This chute is supported at its upper end on the rear ends of the supporting-rails $h'$ and practically forms a continuation of the latter, as shown in Figs. 1, 2, and 3.

Although the husking mechanism shown in the drawings may be used to remove the husks and silks from but one ear at a time, the same is so organized as to form practically two husking devices which operate alternately, and means are provided for delivering the ears of corn from the cutting mechanism alternately to said husking devices. These husking devices are arranged side by side underneath the delivery-chute of the cutting mechanism, and the like parts of the same are identical in construction, but operate alternately, so that while one husking device is operating on one ear of corn for removing the husks therefrom the other husking device is in position to receive a new ear of corn from the cutting mechanism. After the ear of corn has been delivered from a holder upon the chute the latter conducts the same to a switching or distributing device which directs the ear of corn alternately to the two husking devices and which is constructed as follows:

At the lower end of the chute N are arranged the two sections of a distributing-hopper, which extends horizontally in opposite directions from the delivery or lower end of the chute, as shown in Fig. 4. Each of these hopper-sections consists of a rigid front wall or side $o$ and a vertically-movable rear side or wall $o'$, which is pivoted by rock-arms $o^2$ upon a stationary cross-bar $o^3$ on the main frame. In its lowered position the rear hopper-wall is sufficiently close to the companion front wall to prevent an ear of corn from dropping between the same. Upon swinging the rear wall rearwardly and upwardly by its arms the corn therein drops through the open bottom thereof upon a horizontal table P arranged below the same. Such a table is provided for each of the husking devices and the same are arranged horizontally side by side. The upward movement of each rear hopper-wall is effected by means of a rock-lever $o^4$, pivoted on the main frame above the hopper and connected at its free end by a rod $o^5$ with the adjacent rock-arm $o^2$ of said wall and a rotary cam or tappet $o^6$, engaging with the free end of the rock-lever for lifting the same. When the cam clears the rock-lever $o^4$, the rear hopper-wall drops downwardly into its operative position by gravity, the extent of this movement being limited by means of a pin $o^7$, arranged on the main frame and engaged by one of the arms $o^2$, as shown in Fig. 10. The hopper-operating cam $o^6$ is rotated in the proper direction (indicated by the arrow, Fig. 10) by means of a pinion $o^8$, secured to the outer end of the shaft which carries the front sprocket of the carrying-belt and meshing with a gear-wheel $o^9$, secured to the shaft $o^{10}$, which carries the hopper-opening cam $o^6$. As the ears of corn issue from the chute they drop upon the opposing inner ends of the two hopper-sections and then are deflected or moved transversely in one hopper or the other by a distributing device which comprises a distributing plate or deflector. This deflector is preferably constructed in the form of a disk or upright plate Q, secured at its rear end to a horizontally-movable shipper-rod $q$, which moves back and forth in the hopper-sections and is arranged lengthwise in the rear part of both hoppers. This rod is guided on the frame and moved lengthwise in the hoppers, together with the deflector, by means of an upright rock-lever $q'$, pivoted to the main frame and connected on its upper arm to the outer end of the shipper-rod.

Each of the movable rear walls of the distributing-hopper is provided with an actuating mechanism such as above described, the same being arranged on opposite sides of the machine, as shown. The operating mechanisms for the rear walls of both distributing-hoppers are so timed that they are both in their lower or operative position while the ear of corn is directed into the trough by the chute and delivered by the deflector either into one section of the hopper or the other, after which that particular side of the hopper which receives the ear of corn is opened by raising of its rear wall for discharging the ear of corn therefrom to the table below and then again closed preparatory to receiving the ear of corn which is to be directed into the other hopper-section. The latter after receiving the ear of corn in like manner opens up for discharging the ear upon the table of the respective husking mechanism and is again closed for restoring the hopper and enabling the next following ear of corn to be properly directed into the first-mentioned of the hopper-sections.

The movement of the deflector is so timed that it remains at rest on one side of the chute until an ear of corn has been delivered upon the opposing inner ends of the hopper-sections. Then the deflector moves laterally to the opposite side of the chute for directing the ear of corn into the respective hopper-section and remains there until the following ear has been delivered by the chute into the hopper, after which the deflector is moved into the opposite direction for moving the last-mentioned ear into the other hopper-section, this movement of the deflector from one section to the other continuing intermittently while the machine is in operation.

Inasmuch as the two husking devices which receive the ears of corn alternately from the cutting mechanism are practically identical in construction and operation, the following description of one will apply to both, in so far as the parts are duplicated.

R S represent a pair of rotary husking members or rollers which are arranged parallel with each other and transversely below the chute. These husking-rollers are sufficiently long so as to form the husking members of both husking devices, one end of this pair of rollers being arranged in front of one feed-table P, while the other end of the pair is arranged in front of the feed-table of the other husking device. By thus employing husking-rollers of such length that opposite ends thereof form part of two separate husking devices the construction of the machine is simplified. The front husking member R is arranged about on a level with the tables, while the rear member S is arranged slightly below the level of the tables and about midway between the front end of the same and the front husking-roller. The front husking-roller preferably consists of a hub $r$ and a plurality of flexible flaps, beaters, or wings $r'$, which are arranged lengthwise on the periphery of the hub. As the front roller rotates its flaps exert a beating action upon the husks and silks of the ear of corn, whereby the same are loosened and removed more or less from the ear. The rear husking-roller is preferably constructed in the form of a cylindrical brush, as shown in Figs. 2, 3, 4, and 10 to 12, which enables the same to remove the husks and silks gently from the ear which have been loosened by the beaters. The combined action of the beater and brush members effectually removes the silks and husks from the ear without bruising the kernels of corn. By this means the quality and the quantity of the yield in cut corn is improved and increased, inasmuch as the kernels retain their full form and none of the corn juices are lost, such as occurs when the kernels of corn are bruised more or less in the act of removing the husks therefrom.

If desired, both of the rotary husking members may be constructed in the form of brushes or in the form of beaters, but it is preferable to construct one in the form of a brush and the other as a beater, as shown in the drawings, because each of these forms produces a desirable effect upon the corn which is peculiar to that form, thereby obtaining the advantage of both forms and producing the best results. The flaps of the beater member may be secured to the hub thereof in any suitable manner, but preferably by inserting the inner ends of the flaps or wings in longitudinal grooves $r^2$, formed in the hub and securing the same therein by means of wires $r^3$, which surround the hub and pass through holes in the flaps, the ends of each wire being twisted together, as shown in Figs. 3, 4, and 10 to 12. The husking members are preferably rotated so that their upper sides move forward or away from the feed-table, which causes the opposing sides of these members to move in opposite directions, as indicated by the arrows in Fig. 11. The means for thus rotating these members (shown in Figs. 1, 2, 3, and 4) consist of a belt $s'$ passing around the pulley $i^5$ on the main shaft, pulleys $s^2$ $s^3$ on the ends of the front and rear husking-rollers, and an idler-pulley $s^4$ mounted on the main frame. After an ear of corn drops from one of the hopper-sections upon the table below the same it is carried forwardly from the latter into engagement with the opposing upper parts of the husking-rollers by a shifting device which comprises a pair of rock-arms T, arranged to swing vertically forward and backward on opposite sides of the respective table, a rock-shaft $t$ supporting these arms at their lower ends, and a yielding retaining or shifting-head or sweep U, which swivels on the upper ends of the rock-arms T. This head consists, essentially, of vertically-swinging yokes $u$, pivoted on the rock-arm T, a pair of transverse rods $t'$ connecting the two yokes on opposite sides of their pivot, and a web or apron $t^2$ connecting said rods and composed of leather or other flexible material. While the ear of corn is being discharged from the distributing-hopper, the rock-arms T are swung rearwardly so that the shifting or retaining head carried thereby is in rear of the distributing-hopper, as shown by full lines in Fig. 12 and by dotted lines in Fig. 10. After the ear has dropped upon the table-section the rock-arms T move forwardly, together with the shifting-head, until these parts occupy the position shown by full lines in Figs. 1, 2, 10, and 11. During this movement the corn is swept or carried forwardly over the table and delivered upon the upper opposing parts of the husking members. The corn is held by the head U in engagement with both of these members a sufficient length of time to enable them to remove the husks and silks therefrom by retaining the shifting-head in such position that its apron faces both of the husking members and the plane thereof is substantially parallel with a line drawn transversely through the axis of both husking members, as shown in Fig. 10. While the ear of corn is thus confined by the head U upon the husking-rollers, the latter by their rotary engagement with the ear cause the same to rotate freely and present all sides thereof to the husking and cleaning action of the husking-rollers. For the purpose of increasing the effectiveness of the husking-rollers the same are rotated so that the peripheral portions of the same move at a differential or unequal speed. This can be effected in various ways, but preferably by making the front and rear husking-rollers of the same diameter, but making the pulley $s^2$ smaller in diameter than the pulley $s^3$, as shown in Figs. 1 and 2, thereby causing the front roller to turn faster than the rear roller. By this means the ear of corn is not only turned, but a grinding action is exerted upon the same by the differential rotation of the rollers, which has the effect of stripping the husks gently and not violently from the ear. The ear of corn is yieldingly held in engagement with the husking-rollers by the flexible apron of the shifting-head, which enables ears of different diameter to be held reliably in engagement with the rotary huskers and at the same time permit the latter by their frictional engagement with the ear to turn the same for subjecting all parts of the ear to the action of the huskers and insure removal of all the husks and silks therefrom.

By employing a flexible apron for holding the ear of corn in position on the husking-rollers the apron is able to adapt itself to different lengths and shapes of ears and engage the same along the entire bulging or irregular side thereof, whereby the ear is firmly held throughout its entire length in engagement with the husking-rollers, thus insuring thorough stripping and cleaning of the husks and silks therefrom.

The husks and silks removed by the rollers are discharged forwardly and downwardly therefrom. After the ear of corn has been subjected to the action of the husking members a sufficient length of time to thoroughly remove the husks and silks therefrom the shifting-head is rocked vertically or in a direction transversely to the axis of the husking members until the same assumes the position shown by dotted lines in Fig. 11. During this movement of the shifting-head the lower end thereof moves across the top of the rear husking member, while its upper end moves away from the front husking member. When this occurs, the ear of corn is lifted out of engagement from the rear husking member and placed wholly under the influence of the front husking member. In this changed position of the shifting-head the space between the apron of the head and front husking member widens upwardly, inasmuch as the apron of the shifting-head now only faces the front roller, thereby causing the ear of corn, which is now wholly out of contact from the rear husking member, to be discharged upwardly and forwardly from the machine by the rotation of the front husking member. This discharging movement of the shifting head occurs while the supporting rock-arms T thereof remain stationary in their forward position. After the husked ear of corn has been thus discharged the rock-arms T, together with the shifting-head mounted thereon, are returned into the rearward receiving position shown by dotted lines in Fig. 10 preparatory to receiving the next ear of corn from the distributing-hopper.

The mechanism for oscillating the rock-shaft $t$, which carries the rock-arms T, may be variously constructed, that shown in the drawings consisting of an upright rock-lever V, having its lower arm connected by a link $v$ with a depending rock-arm $v'$ on the shaft $t$, a rotary cam $v^2$, mounted on one of the counter-shafts $o^{10}$ and engaging with a roller on the upper arm of the rock-lever V, and a spring $v^3$, connecting an upright arm $v^4$ on the rock-shaft $t$ with the main frame, as shown in Figs. 1, 3, and 4. These parts are so organized that the rock-arms T, together with the shifting-head mounted thereon, are moved forward positively by the cam $v^2$, while the return movement of these parts is effected by the spring $v^3$.

The rocking movement of the shifting-head on the rock-levers for discharging the ear of corn from the husking members and then returning to its normal retracted position is effected by means comprising a transverse rock-lever W, mounted on the lower part of the outer rock-arm T, a rod $w$, connecting the inner arm of the rock-lever W with a lug or arm $w'$, projecting rearwardly from the central part of the adjacent yoke, a rock-lever $w^2$, mounted on the upper part of the main frame and connected by a rod $w^3$ with the other arm of the rock-lever W, a cam $w^4$, mounted on the counter-shaft $o^{10}$ and engaging with the rock-lever $w^2$, and a spring $w^5$, connected with the inner arm of the rock-lever W, as shown in Figs. 1, 2, 3, 4, and 10. The ejecting movement of the shifting-head from the position shown in full lines to that shown in dotted lines in Fig. 11 is effected positively by the cam $w^4$, while the return movement thereof is effected by the spring $w^5$, aided by the weight of the rock-lever and the rod connected therewith.

In order to cause the inner end of the shifting-head to move practically in unison with the outer end thereof during the ejecting movement of the head, an auxiliary spring $x$ is employed, which aids the cam $w^4$ in turning this end of the head in that direction. This spring, as shown in Figs. 11 and 12, exerts its pressure against one end of a rod $x'$, which is guided on the inner rock-arm T of the shifting-head and is connected at its other end with a lug $w^6$ on the rear central part of the adjacent inner yoke of the head.

The actuating mechanisms of the shifting devices whereby the ears of corn are carried from the feed-tables to opposite ends of the rotary husking members are so timed that these shifting devices are operated alternately and in harmony with the ear-distributing devices above the same, so as to cause one of the ear-shifting devices to move an ear from one of the tables forwardly and hold the same in working engagement with the corresponding ends of the husking members while the other shifting device has been moved rearwardly in position to receive an ear of corn from the distributing device. By this means practically two husking devices are supplied continually from a single feeding and trimming or cutting mechanism, thereby obtaining the maximum capacity of the machine.

In order to prevent the ears of corn as they fall upon the tables from rolling off at the front end thereof and also to enable the corn to be placed under the control of the shifting devices for properly presenting the same to the husking members, movable gates or walls Y are arranged at the front ends of the tables. Each of these gates consists, preferably, of a plate which normally projects upwardly at the front end of the respective table and is secured at its lower end to a transverse rock-shaft $y$, which is journaled horizontally in bearings at this end of the table. This gate is yieldingly held in its elevated position by means of a spring $y'$, connecting a depending arm $y^2$ on this shaft with a stationary part of the main frame below the same. If the ear of corn when dropped upon the feed-table should roll forwardly, the same is prevented from leaving the front end of the table by the elevated gate which it encounters. As the shifting-head engages with the corn and moves it from the feed-table to the husking members the stop-gate is deflected sufficiently to permit the corn to pass over the same, as shown in Fig. 11. After the corn and shifting-head have cleared the gate the latter is again returned to its operative elevated position by the spring $y'$. During the return movement the shifting-head again strikes the gate and turns the same in the opposite direction; but this movement is only incidental and of no consequence. In the absence of the stop-gate the corn at times would be liable to roll off from the table upon the husking members and immediately be discharged from the latter while only partially husked, this being due to the absence at this time of the shifting and holding devices for retaining the corn in engagement with the husking members.

The rock-lever $q'$, which reciprocates the plate or deflector of the distributing device, is preferably oscillated by an elbow-lever $z$, having one of its arms connected with the lower arm of the rock-lever $q'$, while its other arm is connected by a rod $z'$ with a rock-arm $z^2$, depending from one of the rock-shafts $t$, as represented in Figs. 1, 2, and 4.

My improved corn-husking machine not only removes the husks and silks from the ears of corn thoroughly and expeditiously with a minimum amount of waste, but the same is also durable and comparatively simple in construction and contains no delicate parts which require close adjustment or are liable to get out of order.

I claim as my invention—

1. In a corn-husking machine, the combination of a cutter, a holder for receiving an ear of corn and presenting the same to said cutter comprising a bottom, a fixed jaw arranged at one end of the bottom, a movable jaw arranged at the other end of the bottom, guide-rods arranged on the bottom and supporting said movable jaw, and springs for yieldingly shifting said movable jaw toward the fixed jaw, and means for moving said holder past said cutter, substantially as set forth.

2. In a corn-husking machine, the combination of a cutter, a holder for receiving an ear of corn and presenting the same to said cutter comprising fixed and movable jaws, means for moving said holder past said cutter, and automatic means operating to separate said jaws in rear of the cutter to permit of placing an ear in the holder and again separating said jaws in front of the cutter to permit of discharging the ear from the holder, substantially as set forth.

3. In a corn-husking machine, the combination of a cutter, a holder for receiving an ear of corn and presenting the same to said cutter comprising fixed and movable jaws, means for moving said holder past said cutter, a spring for yieldingly shifting the movable jaw toward the fixed jaw, and means for separating the movable jaw from the fixed jaw comprising a rock-lever pivoted on the holder and having a trip-arm constructed to engage with a stationary abutment for turning the lever and an actuating-arm constructed to engage said movable jaw for shifting the same from the fixed jaw, substantially as set forth.

4. In a corn-husking machine, the combination of a cutter, a holder for receiving an ear of corn and presenting the same to said cutter consisting of a bottom, a fixed jaw at one end of the bottom, a movable jaw guided on the other end of the bottom, and a spring operating to shift said movable jaw toward the fixed jaw, a carrier for moving said holder past said cutter comprising an endless belt which passes around front and rear supporting-wheels, and means for separating said jaws for receiving and discharging the ear comprising a lever pivoted on the holder and having a trip-arm arranged to engage the hubs of said supporting-wheels for turning the same, and an actuating-arm constructed to engage said movable jaw for shifting the same from the fixed jaw, substantially as set forth.

5. In a corn-husking machine, the combination of a cutter, a holder for receiving an ear of corn and presenting the same to said cutter, a carrier for moving said holder past said cutter comprising an endless belt passing around supporting-wheels, and means for guiding the holder comprising stationary rails arranged lengthwise on opposite sides of the belt and engaging with recesses in the sides of the holder, substantially as set forth.

6. In a corn-husking machine, the combination of a cutter, a holder for receiving an ear of corn and presenting the same to the cutter, means for moving said holder past said cutter, and means for retaining the ear in said holder comprising a bar arranged above the path of the holder and in position to close the mouth thereof, substantially as set forth.

7. In a corn-husking machine, the combination of a cutter, a holder for receiving an ear of corn and presenting the same to the cutter, means for moving said holder past said cutter, and means for retaining the ear in said holder consisting of a bar arranged lengthwise of the open side of the holder, and a pressing device for moving said bar yieldingly toward said holder, substantially as set forth.

8. In a corn-husking machine, the combination of a cutter, a holder having a mouth for receiving an ear of corn and presenting the same to said cutter, a carrier for moving said holder past the cutter with its mouth facing upwardly, and means for preventing the ear from rising in the holder comprising a vertically-movable retaining-bar arranged constantly lengthwise above the path of said holder so as to extend over the mouth thereof, and a pressure device for holding the bar yieldingly in a depressed position, substantially as set forth.

9. In a corn-husking machine, the combination of a cutter, a holder for receiving an ear of corn and presenting the same to said cutter, a carrier for moving said holder past the cutter with its mouth facing upwardly, and means for preventing the ear from rising in the holder comprising a vertically-movable retaining-bar arranged lengthwise above the path of said holder so as to extend over the mouth thereof, upright rods connected at their lower ends with said bar and guided in a support, and weight-levers bearing against the upper ends of said rods, substantially as set forth.

10. In a corn-husking machine, the combination of a cutter, a holder for receiving an ear of corn and presenting the same to said cutter, means for moving said holder past said cutter with its mouth facing upwardly, and means for preventing rising of the ear in said holder comprising two vertically-movable retaining-bars arranged lengthwise side by side above the mouth of the holder, and a presser device for yieldingly holding said bars in a depressed position, substantially as set forth.

11. In a corn-husking machine, the combination of a cutter, a movable holder for receiving an ear of corn and presenting the same to said cutter, a stationary gage arranged to be engaged by one end of said ear, and a yielding presser device arranged to engage the opposite end of said ear, substantially as set forth.

12. In a corn-husking machine, the combination of a cutter, a movable holder for receiving an ear of corn and presenting the same to said cutter, an adjustable stationary gage arranged to be engaged by one end of said ear, and a yielding pressing device constructed to engage with the other end of said ear, substantially as set forth.

13. In a corn-husking machine, the combination of a cutter, a movable holder for receiving an ear of corn and presenting the same to said cutter, a stationary gage arranged lengthwise on one side of the path of the holder in rear of the cutter and adapted to be engaged by one end of said ear, and a yielding presser device arranged on the opposite side of said path and engaging with the other end of said ear, substantially as set forth.

14. In a corn-husking machine, the combination of a cutter, a movable holder for receiving an ear of corn and presenting the same to said cutter, a stationary gage arranged lengthwise on one side of the path of the holder in rear of the cutter and adapted to be engaged by one end of said ear and a presser device consisting of an oblique plate arranged on the opposite side of said path and adapted to engage with the other end of said ear, and means for moving said plate yieldingly toward said gage, substantially as set forth.

15. In a corn-husking machine, the combination of a cutter, a movable holder for receiving an ear of corn and presenting the same to said cutter, a stationary gage arranged lengthwise on one side of the path of the holder in rear of the cutter and adapted to be engaged by one end of said ear and a presser device for moving said ear against said gage consisting of an oblique presser-plate arranged on the opposite side of said path and adapted to engage with the other end of said ear, a pivot for the rear end of said plate, a rod connected with the front end of the presser-plate and passing through a guide, and a weight connected by a cord with said rod and passing around an intermediate roller, substantially as set forth.

16. In a corn-husking machine, the combination of a cutter, a movable holder for receiving an ear of corn and presenting the same to said cutter, and a stationary gage arranged to be engaged by the butt-end of said ear and provided with a slot through which the stub of the ear is adapted to pass, substantially as set forth.

17. In a corn-husking machine, the combination of a cutter, a movable holder for receiving an ear of corn and presenting the same to said cutter, and a gage comprising two bars which engage with the butt of the ear and are separated to form a slot for receiving the stub of the ear and one of said bars being movable toward and from the other, substantially as set forth.

18. In a corn-husking machine, the combination of a cutter, a movable holder for receiving an ear of corn and presenting the same to said cutter, and a gage comprising a lower fixed bar and an upper vertically-movable bar which are arranged to be engaged by the butt of the ear and which are separated to form a slot which receives the stub of the ear, and means for yieldingly moving the upper bar toward the lower bar, substantially as set forth.

19. In a corn-husking machine, the combination of a cutter, a movable holder for receiving an ear of corn and presenting the same to said cutter, and a gage comprising a lower fixed bar and an upper vertically-movable bar which are arranged to be engaged by the butt of the ear and which are separated to form a slot which receives the stub of the ear, vertical rods upon which the upper gage-bar is guided, and springs for yieldingly retaining the upper guide-bar in its depressed position, substantially as set forth.

20. In a corn-husking machine, the combination of a movable holder for supporting an ear of corn, cutters arranged on opposite sides of the path of said holder and one ahead of the other, gages arranged adjacent to said cutters, and pressing devices arranged opposite the gages for moving the ear first against one gage preparatory to cutting off one of its ends and then moving the same against the other gage preparatory to cutting off the other end thereof, substantially as set forth.

21. In a corn-husking machine, the combination of rotary husking members arranged to support an ear of corn partly on each member, means for rotating said member so that their opposing sides move in opposite directions and means for pressing the ear against said members, substantially as set forth.

22. In a corn-husking machine, the combination of husking members arranged to support an ear of corn partly on each member, means for rotating said members so that the periphery of one moves in the opposite direction and faster than that of the other, and means for pressing the ear against said members, substantially as set forth.

23. In a corn-husking machine, the combination of rotary husking members arranged to support an ear of corn partly on each member, one of said members constructed in the form of a brush and the other having a plurality of flexible strips or wings, and means for pressing the ear against said members, substantially as set forth.

24. In a corn-husking machine, the combination of rotary husking members arranged to support an ear of corn partly on each member, one of said members consisting of a hub provided in its periphery with a plurality of longitudinal grooves, flexible strips or wings seated at their inner edges in said grooves, and tie wires or cords passing around said hub and through openings in said wings, substantially as set forth.

25. In a corn-husking machine, the combination of rotary husking members arranged to receive an ear of corn between them, and means for holding the ear yieldingly in engagement with the husking members comprising a flexible apron arranged to engage with the ear, and movable toward and from the husking members in a plane at right angles to the axis thereof, substantially as set forth.

26. In a corn-husking machine, the combination of rotary husking members arranged to receive an ear of corn between them, and means for holding the ear yieldingly in engagement with the husking members comprising a flexible apron arranged to engage with the ear, rods supporting opposite edges of the apron, and yokes connecting the corresponding ends of said rods, substantially as set forth.

27. In a corn-husking machine, the combination of rotary husking members, and means movable toward and from the husking members in a plane at right angles thereto and constructed and operating to hold an ear of corn in contact with said members and then releasing the same, substantially as set forth.

28. In a corn-husking machine, the combination of rotary husking members, a shifting-head for holding an ear of corn in engagement with said members while in one position and to release said ear in another position, and means for actuating said head, substantially as set forth.

29. In a corn-husking machine, the combination of rotary husking members, a support movable toward and from said husking members, a shifting-head mounted on said support and adapted to hold an ear of corn against said members, and means for turning said head on its support for releasing the ear from said members, substantially as set forth.

30. In a corn-husking machine, the combination of revoluble husking members, a shifting-head for holding an ear of corn in engagement with said members and for releasing the same therefrom, and a rocking support whereby said head is moved bodily toward said members for holding the ear against the same and upon which said head is capable of turning for releasing the ear, substantially as set forth.

31. In a corn-husking machine, the combination of revoluble husking members, a shifting-head for holding an ear of corn in engagement with said members and for releasing the same therefrom, rock-arms upon which said head is pivoted, means for moving said arms toward and from said members, and means for turning said head on said arms, substantially as set forth.

32. In a corn-husking machine, the combination of revoluble husking members, a shifting-head for holding an ear of corn in engagement with said members and for releasing the same therefrom, rock-arms upon which said head is pivoted, means for moving said arms toward and from said members, and a rock-lever mounted on one of said rock-arms and connected with said head, substantially as set forth.

33. In a corn-husking machine, the combination of revoluble husking members, a shifting-head for holding an ear of corn in engagement with said members and to release the same therefrom, said head consisting of a flexible apron, rods supporting the ends of said apron and yokes connecting corresponding ends of said rods, rock-arms which are movable toward and from said husking members and upon which the yokes of said head are pivoted, a cam-operated mechanism for actuating said rock-arms, a rock-lever mounted on one of said rock-arms and connected with a lug on one of the yokes of said shifting-head, and a cam-operated mechanism for actuating said rock-lever, substantially as set forth.

34. In a corn-husking machine, the combination of a feed-table, revoluble husking members arranged in front of said table, and a carrier movable back and forth between said table and said members and adapted to deliver ears of corn from said table to said members, substantially as set forth.

35. In a corn-husking machine, the combination of a feed-table, a pair of revoluble husking members arranged lengthwise in rear of said table, the front member of said pair having its axis substantially in line with the plane of the table while the rear member has its axis below the plane of said table, and means for delivering ears of corn from the table to said members, substantially as set forth.

36. In a corn-husking machine, the combination of a feed-table, revoluble husking members arranged in front of said table, means for delivering ears of corn from the table to said members, and a movable stop or gate arranged at the front end of said table, substantially as set forth.

37. In a corn-husking machine, the combination of a feed-table, revoluble husking members arranged in front of said table, means for delivering ears of corn from the table to said members, a movable stop or gate arranged at the front end of said table, and means for yieldingly holding said gate in position, substantially as set forth.

38. In a corn-husking machine, the combination of a feed-table, revoluble husking members arranged in front of said table, means for delivering ears of corn from the table to said members, a rock-shaft arranged at the front end of the table, a gate secured to said shaft, and a spring operating to turn said shaft and cause the gate to normally project upwardly, substantially as set forth.

39. In a corn-husking machine, the combination of a feed-table, revoluble husking members arranged in front of said table, a gate yieldingly arranged at the front end of said table, and means for delivering ears of corn from said table to the said husking members comprising a shifting-head movable forward and backward over said table and members, and rock-arms upon which said head is pivoted, substantially as set forth.

40. In a corn-husking machine the combination of a husking device, a feed-hopper having two downwardly-converging walls one of which is fixed while the other is movable laterally, and means operating to move said movable wall toward and from the fixed wall to permit of holding an ear in the hopper and discharging the same therefrom, substantially as set forth.

41. In a corn-husking machine, the combination of a feed-table, a husking device arranged in front of said table, a feed-hopper arranged above the table and having two side walls one of which is fixed while the other is movable laterally toward and from the fixed wall, and means for operating said movable wall intermittently for discharging ears of corn from said hopper upon the table, substantially as set forth.

42. In a corn-husking machine, the combination of two husking devices, a distributing-hopper having two sections which are arranged side by side and each of which has a fixed wall and a wall movable laterally toward and from the fixed wall, means for operating said movable walls alternately, a supply-chute for delivering ears to the opposing ends of the hopper-sections, and a distributing device for carrying the ears from said chute alternately into said hopper-sections, substantially as set forth.

43. In a corn-husking machine, the combination of two husking devices, a distributing-hopper having two sections which are arranged side by side and each of which has a fixed wall and a wall movable laterally toward and from the fixed wall, means for operating said movable walls alternately, a supply-chute for delivering ears to the opposing ends of the hopper-sections, and a distributing device which operates to carry the ears of corn alternately from said chute to either hopper-section and which comprises a plate which reciprocates lengthwise in both hopper-sections, substantially as set forth.

44. In a corn-husking machine, the combination of two husking devices, an ear-distributing hopper consisting of two sections each of which has one of its sides fixed while its other side is movable, vertically-swinging rock-arms supporting the movable sides of said hoppers, cam-levers connected with said movable hopper sides, cams for actuating said cam-levers and operating to raise said movable hopper sides alternately, a chute for directing ears into the opposing sections of the distributing-hopper, a movable distributing-plate operating to shift the ears alternately from said chute to said hopper-sections, a rod supporting said distributing-plate and reciprocating lengthwise in said hopper, and means for actuating said rod, substantially as set forth.

45. In a corn-husking machine, the combination of two feed-tables, two husking devices arranged in front of said tables, respectively, shifting devices constructed to deliver the ears of corn alternately from said tables to the husking devices, a feed-hopper having two sections arranged above the feed-tables and each section having a fixed wall and a laterally-movable wall, means for operating said movable walls alternately, a chute for delivering the ears of corn to the opposing central parts of said hopper, and a distributing device operating to shift the ears from said chute to said sections alternately, substantially as set forth.

Witness my hand this 9th day of December, 1904.

ARTHUR P. WOLFE.

Witnesses:
 THEO. L. POPP,
 EMMA M. GRAHAM.